(12) United States Patent
Yamazaki

(10) Patent No.: US 7,496,289 B2
(45) Date of Patent: Feb. 24, 2009

(54) IMAGE PICKUP APPARATUS, IMAGE PICKUP METHOD THEREFOR, AND COMPUTER-READABLE MEDIUM STORING COMPUTER PROGRAM WITH PANNING CONTROL

(75) Inventor: Tatsuya Yamazaki, Machida (JP)

(73) Assignee: Canon Kabushiki Kaisha (JP)

( * ) Notice: Subject to any disclaimer, the term of this patent is extended or adjusted under 35 U.S.C. 154(b) by 437 days.

(21) Appl. No.: 11/337,288

(22) Filed: Jan. 23, 2006

(65) Prior Publication Data

US 2006/0165396 A1 Jul. 27, 2006

(30) Foreign Application Priority Data

Jan. 24, 2005 (JP) ............... 2005-016134

(51) Int. Cl.
*G03B 17/00* (2006.01)
*H04N 5/228* (2006.01)
(52) U.S. Cl. .................. 396/55; 348/208.3; 348/208.99
(58) Field of Classification Search .................. 396/50, 396/52, 5, 59, 169; 348/208, 208.2–208.4, 348/208.12, 208.16, 208.99
See application file for complete search history.

(56) References Cited

U.S. PATENT DOCUMENTS 5,262,820 A 11/1993 Tamai et al.
5,761,545 A 6/1998 Tanaka et al.
6,445,411 B1 9/2002 Shibata et al.
6,982,746 B1* 1/2006 Kawahara ............... 348/208.99
2002/0027599 A1* 3/2002 Yamazaki .................. 348/208

FOREIGN PATENT DOCUMENTS

JP 2002-209136 A 7/2002
JP 2002-359768 A 12/2002

OTHER PUBLICATIONS

Relevant portion of European Search Report of corresponding European Application 06250347.9-2202.

* cited by examiner

*Primary Examiner*—W. B. Perkey
*Assistant Examiner*—Minh Phan
(74) *Attorney, Agent, or Firm*—Rossi, Kimms & McDowell, LLP

(57) ABSTRACT

An image pickup apparatus which is capable of changing panning control according to the shutter speed to thereby provide a shake prevention effect suitable for shooting conditions. A shutter control section of a microcomputer sets the shutter speed during shooting by the image pickup apparatus. An angular velocity sensor detects a shake of the apparatus. The microcomputer calculates the amount of correction of the shake of the apparatus. The shake of the apparatus is corrected based on the calculated amount of correction of the shake. The microcomputer determines, based on the set shutter speed and the amount of correction of the shake, whether or not the image pickup apparatus is in the panning condition. A panning control section of the microcomputer changes the panning control characteristic based on the set shutter speed and the amount of correction of the shake.

11 Claims, 9 Drawing Sheets

FIG. 4

| SHUTTER SPEED (sec.) | ASSOCIATED DATA |
|---|---|
| 1/2 | 17088 |
| 1/4 | 8544 |
| 1/8 | 4272 |
| 1/15 | 2136 |
| 1/30 | 1068 |
| 1/60 | 534 |
| 1/120 | 267 |
| 1/250 | 128 |
| ⋮ | ⋮ |
| 1/2000 | 16 |
| 1/4000 | 8 |
| 1/8000 | 4 |

FIG. 5

| SHUTTER SPEED (sec.) | PANNING TRANSITION THRESHOLD (deg) | PANNING CONTROL CHARACTERISTIC | | |
|---|---|---|---|---|
| | | SLOPE 1 | WIDTH BETWEEN TWO SLOPES (deg) | SLOPE 2 |
| ~1/4 | 0.3 | 4.0 | 0.0 | 4.0 |
| ~1/8 | 0.25 | 3.0 | 0.05 | 3.5 |
| ~1/15 | 0.2 | 2.0 | 0.05 | 3.0 |
| ~1/30 | 0.17 | 1.0 | 0.07 | 2.5 |
| ~1/60 | 0.14 | 0.8 | 0.09 | 2.0 |
| ~1/120 | 0.12 | 0.7 | 0.1 | 1.7 |
| ~1/250 | 0.1 | 0.6 | 0.1 | 1.5 |
| 1/250~ | 0.09 | 0.5 | 0.1 | 1.5 |

IMAGE PICKUP APPARATUS, IMAGE PICKUP METHOD THEREFOR, AND COMPUTER-READABLE MEDIUM STORING COMPUTER PROGRAM WITH PANNING CONTROL

BACKGROUND OF THE INVENTION

1. Field of the Invention

The present invention relates to an image pickup apparatus and an image pickup method therefor as well as an image pickup program implementing the method and a storage medium storing the program, and more particularly to an image pickup-apparatus equipped with a shake correction function and an image pickup method therefor as well as an image pickup program implementing the method and a storage medium storing the program.

2. Description of the Related Art

Some image pickup apparatuses, such as cameras or video cameras, incorporate an optical shake correction device so as to exert a shake correction function. Shake correction by this shake correction device is performed by driving a shift lens as a part of taking lenses in a direction perpendicular to the optical axis of the taking lenses to thereby change the optical axis of the taking lenses.

FIG. 8 is a block diagram schematically showing the arrangement of an image pickup apparatus incorporating the conventional shake correction device.

Originally, the correction of a shake of an image pickup apparatus is performed in two directions, i.e. a horizontal direction and a vertical direction, on a plane perpendicular to the optical axis of the taking lenses of the image pickup apparatus. For simplicity of explanation, however, there is shown in FIG. 8 the image pickup apparatus configured to perform shake correction only in the horizontal direction.

As shown in FIG. 8, the image pickup apparatus 800 is comprised of an angular velocity sensor 101' that outputs an angular velocity signal representative of a shake of the image pickup apparatus 800, a high-pass filter (HPF) 102' that eliminates a drift and other undesired components of the angular velocity signal output from the angular velocity sensor 101', an amplifier 103' that amplifies the angular velocity signal output from the angular velocity sensor 101', a camera system control microcomputer (hereinafter simply referred to as "the microcomputer") 120' that controls camera functions including shake correction, autofocus (AF), zoom, and automatic exposure (AE), a shift lens 133' as a part of taking lenses, not shown, a position sensor 115' that detects the position of the shift lens 133' to output a position signal, an amplifier 116' that amplifies the position signal output from the position sensor 115', and an H bridge driver 114' that drives the shift lens 133' horizontally on a plane perpendicular to the optical axis of the taking lenses.

The microcomputer 120' is comprised of a built-in A/D converter 104' that converts the angular velocity signal into a digital signal to provide angular velocity data, an HPF 105' and a phase compensation filter 106' that perform predetermined signal processing on the angular velocity data, a variable HPF 107' that is capable of changing a cut-off frequency for panning control, described in detail hereinafter, an integrator 108' that generates an angular signal to provide a correction signal as a target drive value for driving the shift lens 133', a built-in A/D converter 117' that converts the position signal amplified by the amplifier 116' into a digital signal to provide position data, an adder 111' that calculates the difference between the current position of the shift lens 133' and the target drive value to output an actual correction amount, a low-pass filter (LPF) 112' that filters the output from the adder 111' to reduce drive noise generated by the H bridge driver 114', and a pulse width modulator (PWM) section 113' that performs pulse width modulation (PWM) on the output from the LPF 112'.

The microcomputer 120' drives the shift lens 133' on a plane perpendicular to the lens optical axis by the H bridge driver 114' in accordance with the PWMed output from the PWM section 113', to thereby perform shake correction.

In the following, a description will be given of the panning control which is executed by the image pickup apparatus 800.

When a photographer performs a shooting operation involving movement of the image pickup apparatus 800, i.e. a panning operation, it is preferable that an image is moved as intended by the photographer. However, when normal shake correction is performed during the panning operation, an image is suppressed from moving at the start of the panning operation due to execution of the shake correction, and only after a possible shake correction range is exceeded, the image suddenly starts to move. This makes image motion discontinuous. Further, at the end of the panning operation, a phenomenon occurs in which the shake correction is suddenly limited at a correction end so that an image is fixed at the correction end, i.e. a correction end-hitting phenomenon (a state where the shift lens cannot be shifted any more) occurs, which makes it impossible to perform shake correction. To avoid this inconvenience, when the amount of correction by panning control becomes large, DC components of the output of the integrator 108' are cut off so that shake correction device of the image pickup apparatus 800 is centered on a central part of the possible shake correction range.

The panning control includes, by way of example, changing the cut-off frequency of the variable HPF 107' when the output from the integrator 108' exceeds a predetermined correction range, so as to eliminate low-frequency signal components of the integrator output to thereby limit the amount of shake correction. During the panning operation, this panning control makes the shake correction signal, indicative of a target position, closer to a central position of the image pickup area, thereby eliminating the above-mentioned inconvenience.

FIG. 9 is a diagram showing changes in the HPF cut-off frequency (Hz) dependent on changes in the magnitude of the output from the integrator in FIG. 8.

In FIG. 9, a line graph shows the relationship between the magnitude of the output from the integrator 108' and the HPF cut-off frequency (Hz). When the output from the integrator 108' exceeds a set value A, the HPF cut-off frequency (Hz) of the variable HPF 107' becomes higher with an increase in the output from the integrator 108'. Further, when the output from the integrator 108' exceeds a set value B, the HPF cut-off frequency (Hz) rises more sharply so as to prevent occurrence of the correction end-hitting phenomenon.

The amount of shake correction is limited during the panning operation by changing the HPF cut-off frequency (Hz) of the variable HPF 107' according to the magnitude of the output from the integrator 108', as described above, whereby an image can be moved as intended by the photographer.

In the case where a-still image is taken using the image pickup apparatus having the above described shake correction function, it is preferred that the shake prevention effect is higher so as to pick up an unblurred image. However, when a camera shake occurs, panning control is sometimes executed, which can cause degradation of the shake prevention effect. To prevent the degradation of the shake prevention effect, a method has been proposed in which the panning control is switched between moving image shooting and still image shooting (see e.g. Japanese Laid-Open Patent Publication (Kokai) No. 2002-209136). Further, another method has been proposed in which the panning control is inhibited during still image shooting (see e.g. Japanese Laid-Open Patent Publication (Kokai) No. 2002-359768). These methods are now used to enhance the shake prevention effect during still image shooting.

However, in the method in which the panning control is switched between moving image shooting and still image shooting, it becomes impossible, depending on the amount of limitation of the shake correction by panning control, to obtain a shake prevention effect required during a low-shutter speed operation. Further, if the amount of limitation of the shake correction by panning control is too small or panning control is not executed at all, e.g. when panning is intentionally performed by a photographer with a view to panning an image, the correction end-hitting phenomenon can occur, which causes a still image to be blurred or hinders the photographer from shooting an image having a composition intended by him/her.

SUMMARY OF THE INVENTION

It is an object of the present invention to provide an image pickup apparatus and an image pickup method therefor which are capable of changing panning control according to the shutter speed to thereby provide a shake prevention effect suitable for shooting conditions, as well as an image pickup program implementing the method and a storage medium storing the program.

To attain the above object, in a first aspect of the present invention, there is provided an image pickup apparatus that performs panning control with a predetermined panning control characteristic when the image pickup apparatus is in a panning condition, comprising a shutter speed-setting device that sets a shutter speed at which the image pickup apparatus operates when shooting, a shake-detecting device that detects a shake of the image pickup apparatus, a correction amount-calculating device that calculates an amount of correction of the shake of the image pickup apparatus, a shake-correcting device that corrects the shake of the image pickup apparatus based on the calculated amount of correction of the shake of the image pickup apparatus, a panning-determining device that determines, based on the set shutter speed and the amount of correction of the shake of the image pickup apparatus, whether or not the image pickup apparatus is in the panning condition, and a panning control characteristic-changing device that changes the panning control characteristic based on the set shutter speed and the amount of correction of the shake of the image pickup apparatus.

Preferably, the image pickup apparatus further comprises a release device including a release switch for use in shooting, and after the release switch is operated, the panning-determining device determines, based on the set shutter speed and the amount of correction of the shake of the image pickup apparatus, whether or not the image pickup apparatus is in the panning condition, until the operation of the release switch is canceled.

Preferably, as the set shutter speed becomes slower, the panning-determining device does not determine that the image pickup apparatus is in the panning condition, until the amount of correction of the shake of the image pickup apparatus becomes larger.

Preferably, the panning control characteristic is set such that a cut-off frequency for use in the panning control becomes higher with an increase in the amount of correction of the shake of the image pickup apparatus.

Preferably, a rate of increase in the cut-off frequency for use in the panning control with respect to the amount of correction of the shake of the image pickup apparatus becomes larger as the set shutter speed is slower.

Preferably, a rate of increase in the cut-off frequency for use in the panning control with respect to the amount of correction of the shake of the image pickup apparatus is changed when the amount of correction becomes equal to a predetermined value.

To attain the above object, in a second aspect of the present invention, there is provided an image pickup method for an image pickup apparatus that performs panning control with a predetermined panning control characteristic when the image pickup apparatus is in a panning condition, comprising a shutter speed-setting step of setting a shutter speed at which the image pickup apparatus operates when shooting, a shake-detecting step of detecting a shake of the image pickup apparatus, a correction amount-calculating step of calculating an amount of correction of the shake of the image pickup apparatus, a shake-correcting step of correcting the shake of the image pickup apparatus based on the calculated amount of correction of the shake of the image pickup apparatus, a panning-determining step of determining, based on the set shutter speed and the amount of correction of the shake of the image pickup apparatus, whether or not the image pickup apparatus is in the panning condition, and a panning control characteristic-changing step of changing the panning control characteristic based on the set shutter speed and the amount of correction of the shake of the image pickup apparatus.

Preferably, the panning-determining step comprises determining, after a release switch for use in shooting is operated, based on the set shutter speed and the amount of correction of the shake of the image pickup apparatus, whether or not the image pickup apparatus is in the panning condition, until the operation of the release switch is canceled.

Preferably, as the set shutter speed becomes slower, in the panning-determining step, it is not determined that the image pickup apparatus is in the panning condition, until the amount of correction of the shake of the image pickup apparatus becomes larger.

Preferably, the panning control characteristic is set such that a cut-off frequency for use in the panning control becomes higher with an increase in the amount of correction of the shake of the image pickup apparatus.

Preferably, a rate of increase in the cut-off frequency for use in the panning control with respect to the amount of correction of the shake of the image pickup apparatus becomes larger as the set shutter speed is slower.

Preferably, a rate of increase in the cut-off frequency for use in the panning control with respect to the amount of correction of the shake of the image pickup apparatus is changed when the amount of correction becomes equal to a predetermined value.

To attain the above object, in a third aspect of the present invention, there is provided an image pickup program for causing a computer to execute an image pickup method for an image pickup apparatus that performs panning control with a predetermined panning control characteristic when the image pickup apparatus is in a panning condition, comprising a shutter speed-setting module for setting a shutter speed at which the image pickup apparatus operates when shooting, a shake-detecting module for detecting a shake of the image pickup apparatus, a correction amount-calculating module for calculating an amount of correction of the shake of the image pickup apparatus, a shake-correcting module for correcting the shake of the image pickup apparatus based on the calculated amount of correction of the shake of the image pickup apparatus, a panning-determining module for determining, based on the set shutter speed and the amount of correction of the shake of the image pickup apparatus, whether or not the image pickup apparatus is in the panning condition, and a panning control characteristic-changing module for changing the panning control characteristic based on the set shutter speed and the amount of correction of the shake of the image pickup apparatus.

To attain the above object, in a fourth aspect of the present invention, there is provided a computer readable storage medium storing the image pickup program as described above.

With the present invention, the panning control characteristic when the image pickup apparatus is in a panning condition is changed according to the shutter speed. Therefore, it is possible to change the panning control according to the shutter speed to thereby provide a shake prevention effect suitable for shooting conditions.

The above and other objects, features, and advantages of the present invention will become more apparent from the following detailed description taken in conjunction with the accompanying drawings.

BRIEF DESCRIPTION OF THE DRAWINGS

FIG. 4 is a diagram illustrating a table defining the relationship between shutter speed of the image pickup apparatus in FIG. 1 and data associated with the shutter speed;

FIG. 5 is a diagram illustrating a table defining the panning control characteristic in association with the shutter speed of the image pickup apparatus in FIG. 1;

DETAILED DESCRIPTION OF THE PREFERRED EMBODIMENTS

The present invention will now be described in detail below with reference to the drawings showing a preferred embodiment thereof.

Figure 1:
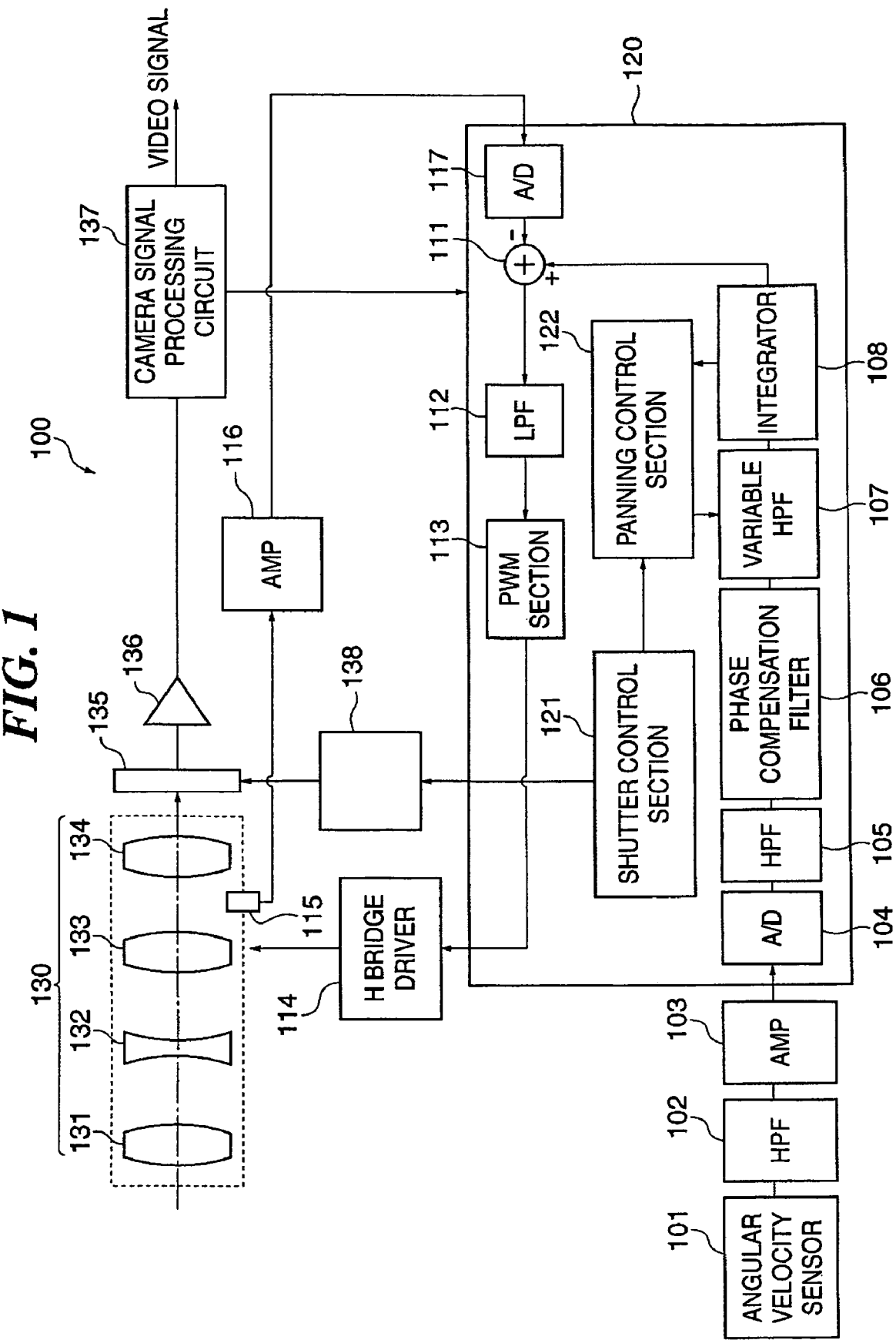
FIG. 1 is a block diagram schematically showing the arrangement of an image pickup apparatus according to an embodiment of the present invention.

FIG. 1 is a block diagram schematically showing the arrangement of an image pickup apparatus according to an embodiment of the present invention.

As shown in FIG. 1, the image pickup apparatus 100 is comprised of a lens unit 130, a CCD 135 that photoelectrically converts an object image formed by the lens unit 130, an analog signal processing section 136 that is comprises of a CDS (Co-related Double Sampling) circuit and an AGC (Automatic Gain Control) circuit and performs predetermined processing on a signal obtained by the CCD 135 to generate an analog image pickup signal, and a camera signal processing circuit 137 that incorporates an A/D converter and performs digital signal processing to generate a final output video signal. These components are connected in series. The lens unit 130 is comprised of a fixed lens group 131, a zoom lens group 132, a shift lens group 133, and a focus compensation lens group 134.

Also, the image pickup apparatus 100 is provided with an angular velocity sensor 101 that detects an angular velocity, i.e. a shake of the image pickup apparatus to output an angular velocity signal, a high-pass filter (HPF) 102 that eliminates a drift and other undesired components of the angular velocity signal output from the angular velocity sensor 101, an amplifier 103 that amplifies the angular velocity signal high-pass filtered by the HPF 102, a camera system control microcomputer (hereinafter simply referred to as "the microcomputer") 120 that controls camera functions including shake correction, autofocus (AF), zoom, and automatic exposure (AE). These components are connected in series.

Further, the image pickup apparatus 100 is provided with an H bridge driver 114 connected to the shift lens group 133, and a pulse width modulator (PWM) section 113, referred to hereinafter; a CCD drive circuit 138 connected to the CCD 135, and a shutter control section 121, described hereinafter, to drivingly control the CCD 135; a position sensor 115 that detects the position of the shift lens group 133; and an amplifier 116 connected to the position sensor 115, and an A/D converter 117, referred to hereinafter.

The microcomputer 120 is comprised of an A/D converter 104 that converts the angular velocity signal into a digital signal to provide angular velocity data, a high-pass filter (HPF) 105 and a phase compensation filter 106 that perform predetermined signal processing on the angular velocity data, a variable high-pass filter (HPF) 107 that is capable of changing a cut-off frequency for panning control, and an integrator 108 that generates an angular signal to output a correction signal as a target drive value for driving the shift lens group 133. These components are connected in series.

Also, the microcomputer 120 includes the A/D converter 117 that converts the output amplified by the amplifier 116 into a digital signal to provide position data, an adder 111 that calculates the difference between the current position of the shift lens group 133 and the target drive value to output an actual correction amount, a low-pass filter (LPF) 112 that reduces drive noise generated during driving of the shift lens group 133 by the H bridge driver 114, and the PWM section 113 that performs pulse width modulation (PWM) on the output from the LPF 112. These components are connected in series.

Further, the microcomputer 120 includes a panning control section 122 that is connected to the variable HPF 107 and the integrator 108 and performs panning control by setting a panning transition threshold according to shutter speed and by changing the cut-off frequency of the variable HPF 107 based on the correction signal output from the integrator 108, and a shutter control section 121 that is connected to the panning control section 122 and the CCD drive circuit 138 and sets optimum shutter speed based on the output video signal output from the camera signal processing circuit 137 to thereby control the CCD drive circuit 138 and transmit information on the current shutter speed to the panning control section 122.

Figure 2:
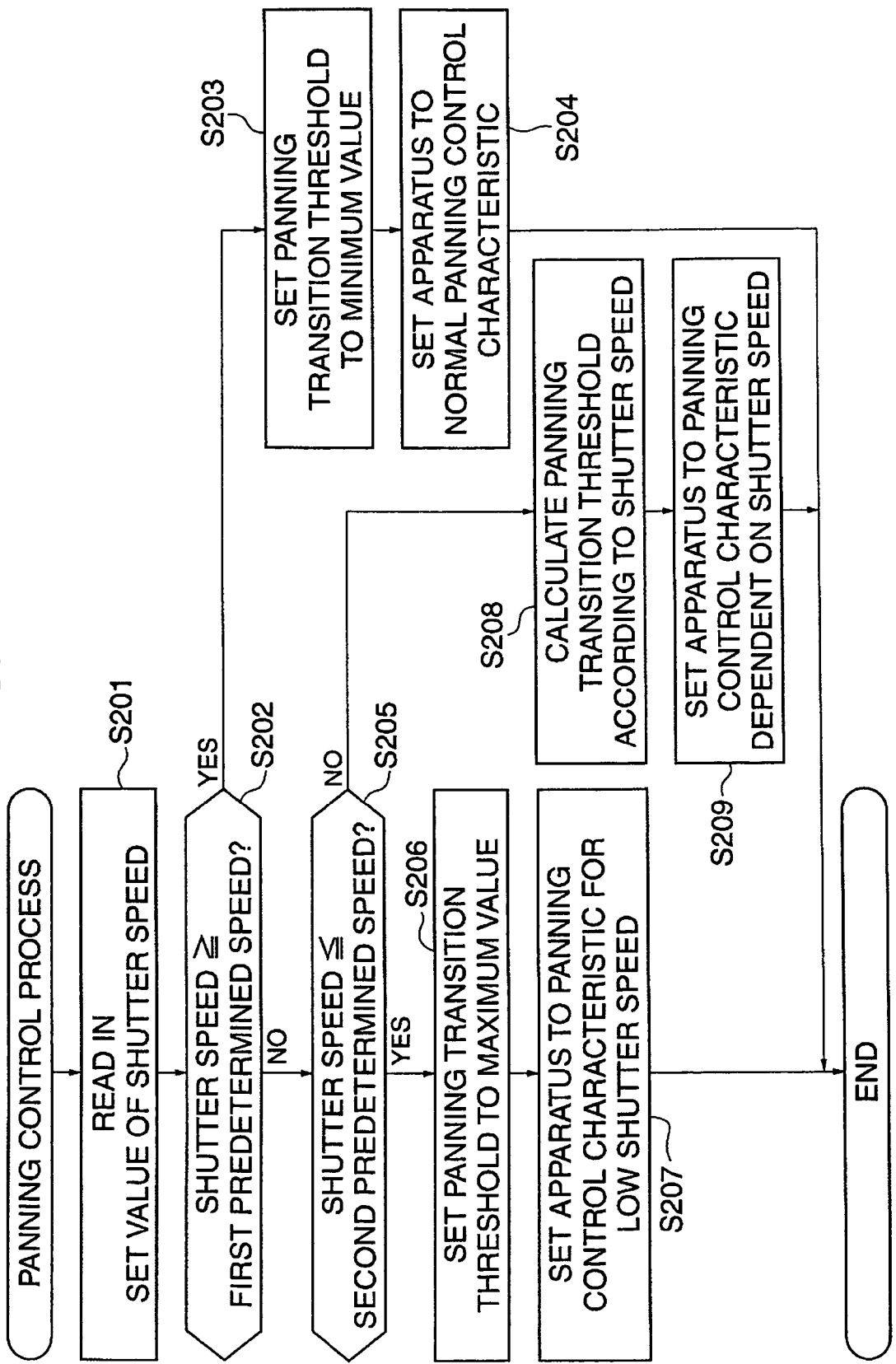
FIG. 2 is a flowchart showing a panning control process which is executed by the image pickup apparatus in FIG. 1.

FIG. 2 is a flowchart showing a panning control process which is executed by the image pickup apparatus in FIG. 1.

As shown in FIG. 2, first, a set value of the shutter speed is read in (step S201), and then it is determined whether the shutter speed is not lower than a first predetermined speed (step S202). The first predetermined speed is set, basically based on a lens focal length, to a value at and above which the shake correction is unnecessary. For example, if the lens focal length corresponds to 250 mm on a 135 film camera, the first predetermined speed is set to a shutter speed of 1/250 sec.

Figure 3:
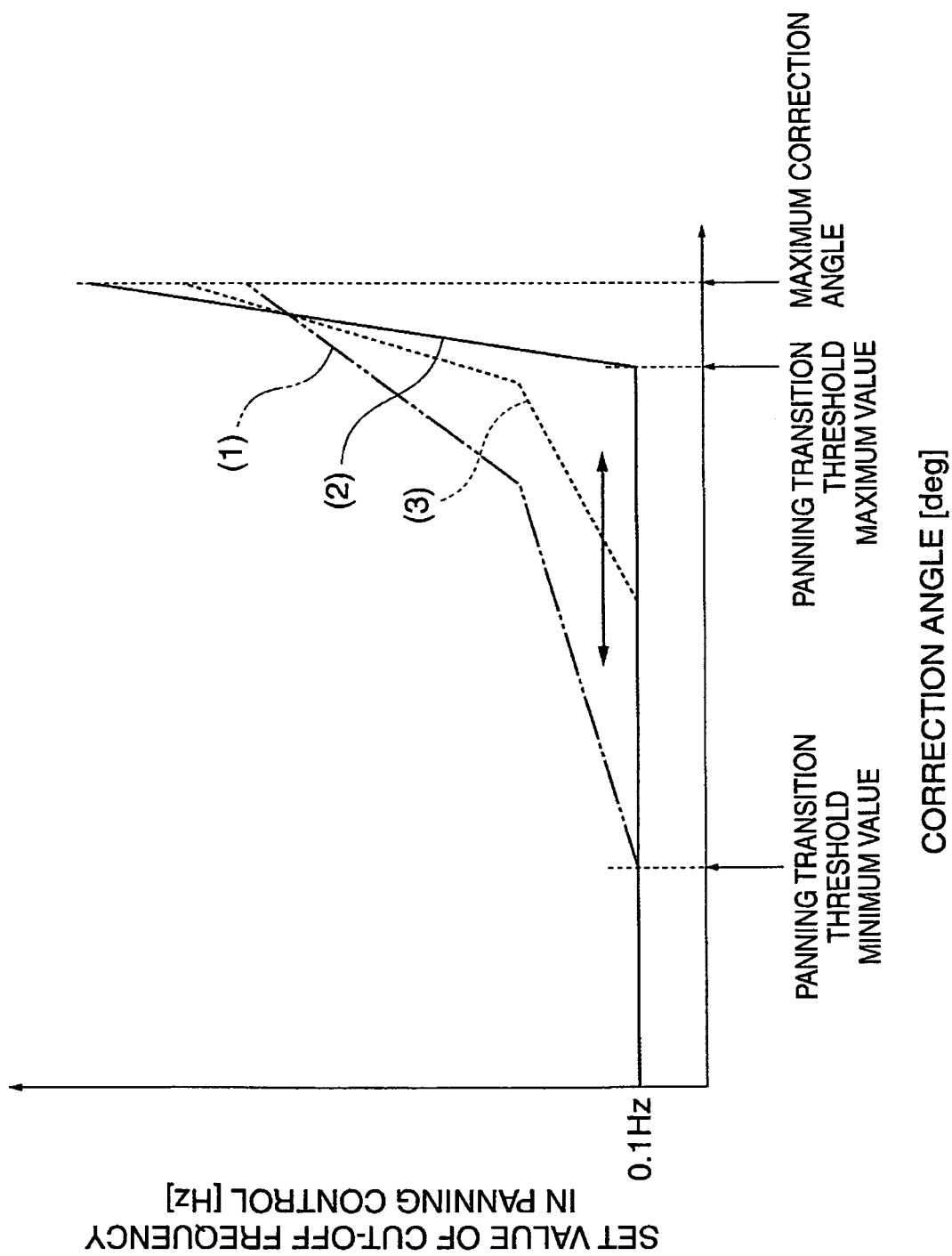
FIG. 3 is a diagram showing changes in a panning control characteristic of the panning control process executed by the image pickup apparatus in FIG. 1.

If the shutter speed is not lower than the first predetermined speed, i.e. if the shutter speed is equal to or faster than the first predetermined speed, the panning transition threshold is set to a minimum value (step S203), and the image pick-up device 100 is set to a normal panning control characteristic (step S204). The normal panning control characteristic is represented by a line graph (1) in FIG. 3, which shows that the cut-off frequency of the variable HPF 107 starts rising at a time point the correction angle exceeds the minimum value of the panning transition threshold, and further, when the correction angle has increased to some extent, the slope of the line graph (1) is made sharper, to thereby prevent occurrence of the correction end-hitting phenomenon. In FIG. 3, the ordinate represents the set value of the HPF cut-off frequency in the panning control operation, while the abscissa represents the shake correction angle (shake correction amount) calculated by using the correction signal output from the integrator 108 and taking into account the focal length of the lens unit 130, etc.

If the shutter speed is below the first predetermined speed, i.e. if the shutter speed is slower than the first predetermined speed, it is determined whether or not the shutter speed is not higher than a second predetermined speed (step S205). The second predetermined speed is set to a lower shutter speed value e.g. 1/8 sec at and below which shake correction is estimated to be undoubtedly required.

If the shutter speed is not higher than the second predetermined speed, the panning transition threshold is set to a maximum value (step S206), and the image pickup apparatus 100 is set to a panning control characteristic for low-shutter speed (step S207). As a consequence, the panning control characteristic of the image pickup apparatus 100 is set to one represented by a line graph (2) in FIG. 3. More specifically, the panning transition threshold is set to be close to a maximum correction angle (correction end), which enables correction of a large blur. When the correction angle exceeds the maximum value of the panning transition threshold, the cut-off frequency of the variable HPF 107 is highly increased to suppress an inappropriate operation due to correction end hitting as much as possible. Further, when the panning control characteristic is set to one for low-shutter speed, the inappropriate operation due to the correction end hitting is suppressed by the integration effect of images stored in the CCD 135 over a long time period (e.g. 1/8 sec.).

If the shutter speed is higher than the second predetermined speed, an interpolated panning transition threshold is calculated from the maximum value of the panning transition threshold and the minimum value of the same according to the shutter speed (step S208), and the panning control characteristic is set so as to be suited to the shutter speed (step S209). The panning control characteristic set according to the shutter speed is represented by a line graph (3) as an intermediate characteristic between ones represented by the line graphs (1) and (2).

The shutter speed read in the step S201 corresponds to the length of a time period over which an image is stored in the CCD 135. For interpolation, data associated with respective values of the shutter speed are provided as shown in FIG. 4 so as to facilitate computation of the panning transition threshold and enable high-speed computation of the panning transition threshold.

In the process shown in FIG. 2, since the panning control characteristic is changed according to the shutter speed (steps S203 and S204, steps S206 and S207, and steps S208 and S209), transition to panning control is made more ready to occur during the high-speed shutter operation in which the influence of a camera shake does not tend to be noticeable, and is made more difficult to occur in the low-speed shutter operation in which the influence of a camera shake tends to be noticeable, thereby making it possible to enhance the shake prevention effect, and hence provide a shake prevention effect suitable for shooting conditions.

In the process in FIG. 2, the minimum value of the panning transition threshold (step S203), the maximum value of the same (step S206), and the panning control characteristic (steps S204 and S207) are set in advance in association with respective predetermined values of the shutter speed, and the panning transition threshold (step S208) and the panning control characteristic (step S209) are calculated by interpolation according to the shutter speed. However, this is not limitative. For example, there may be a method in which values of the panning transition threshold and panning control characteristics associated with respective values of the shutter speed are set as a data table in the microcomputer, and a panning transition threshold and a panning control characteristic are read out from the set data table according to the shutter speed. Any other method enabling optimum panning control according to the shutter speed may also be employed.

Figure 9:
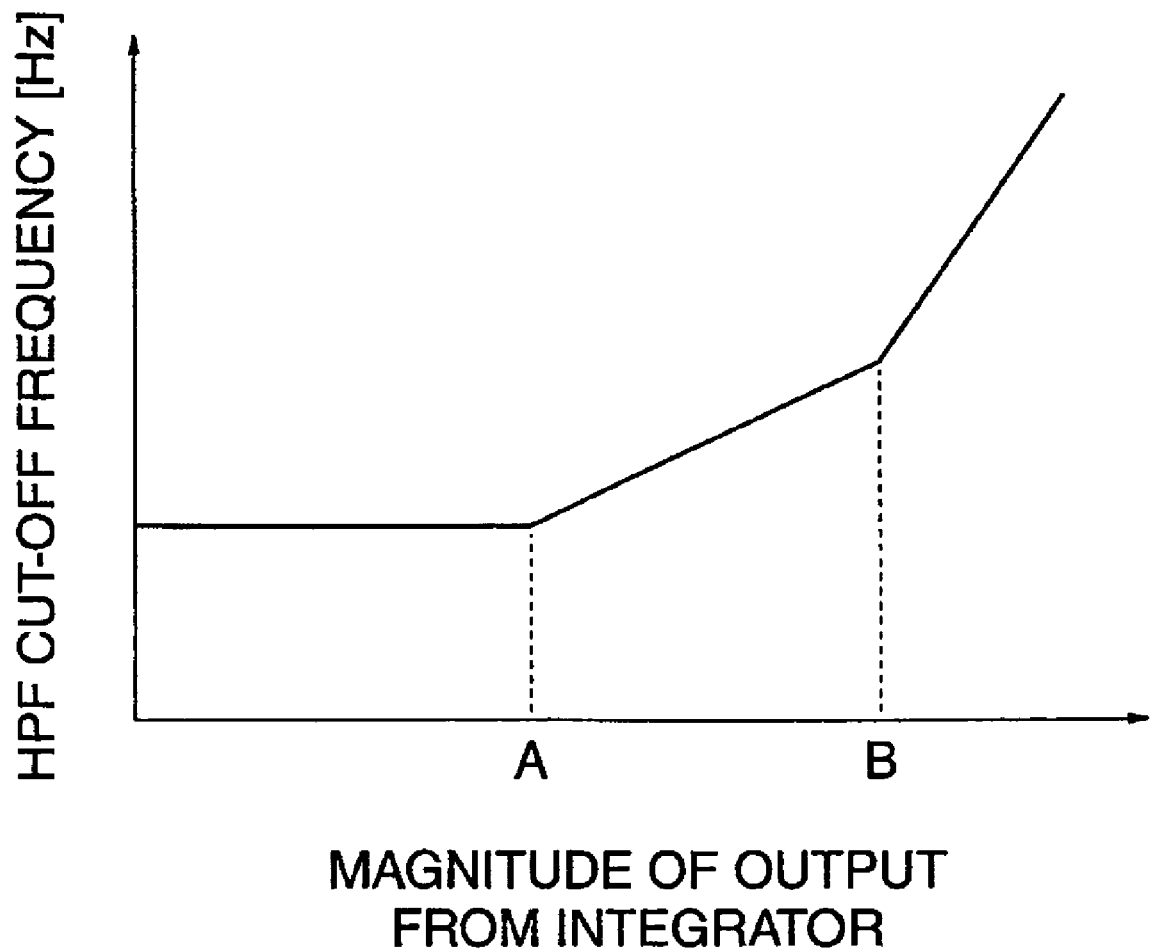
FIG. 9 is a diagram showing changes in a cut-off frequency of a variable HPF dependent on changes in the magnitude of output from an integrator appearing in FIG. 8.

As shown by way of example in FIG. 5, the relationship between the panning transition threshold and the panning control characteristic which are set according to the shutter speed may be tabulated. This table is set in the microcomputer in advance, and data is read according to a set value of the shutter speed. Using FIG. 9 (here, the abscissa is regarded as representative of the correction angle) an explanation is given of a panning transition threshold and a panning control characteristic for a case where a shutter speed is 1/60 sec. In this case, the panning transition threshold (point A) is 0.14 deg, a width or distance between the point A and a point B is 0.09 deg., and the slope of the line graph is 0.8 in a range from the point A to the point B, and 2.0 in a range exceeding the point B. The use of the table thus set in the microcomputer makes it possible to provide panning control with the shutter speed-dependent panning control characteristic. It should be noted that in FIG. 5, the first predetermined speed is 1/250 sec. and the second predetermined speed is 1/4 sec.

Figure 6:
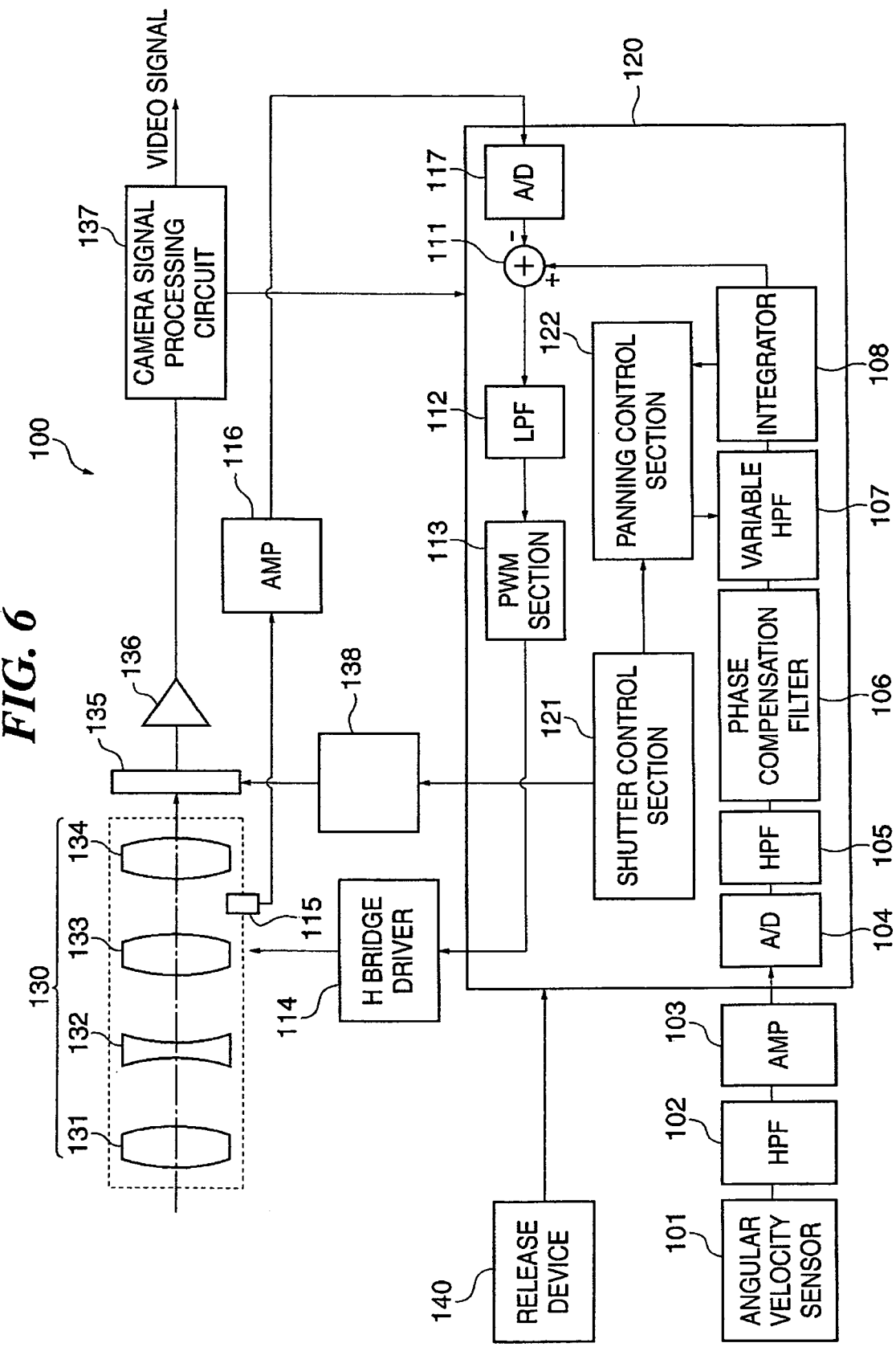
FIG. 6 is a block diagram schematically showing the arrangement of a variation of the image pickup apparatus in FIG. 1.

FIG. 6 is a block diagram schematically showing the arrangement of a variation of the image pickup apparatus in FIG. 1.

The image pickup apparatus in FIG. 6 has basically the same arrangement as that in FIG. 1. Therefore, the same component parts and elements corresponding to those in FIG. 1 are designated by the same reference numerals, and duplicate description thereof is omitted, but only different points from the image pickup apparatus in FIG. 1 will be described.

As shown in FIG. 6, the image pickup apparatus 100 is provided with a release device 140 in addition to the component parts and elements shown in FIG. 1. This release device 140 includes a release switch, and when the release switch is depressed to a first stage, the same operation as shown in FIG. 2 is carried out.

Figure 7:
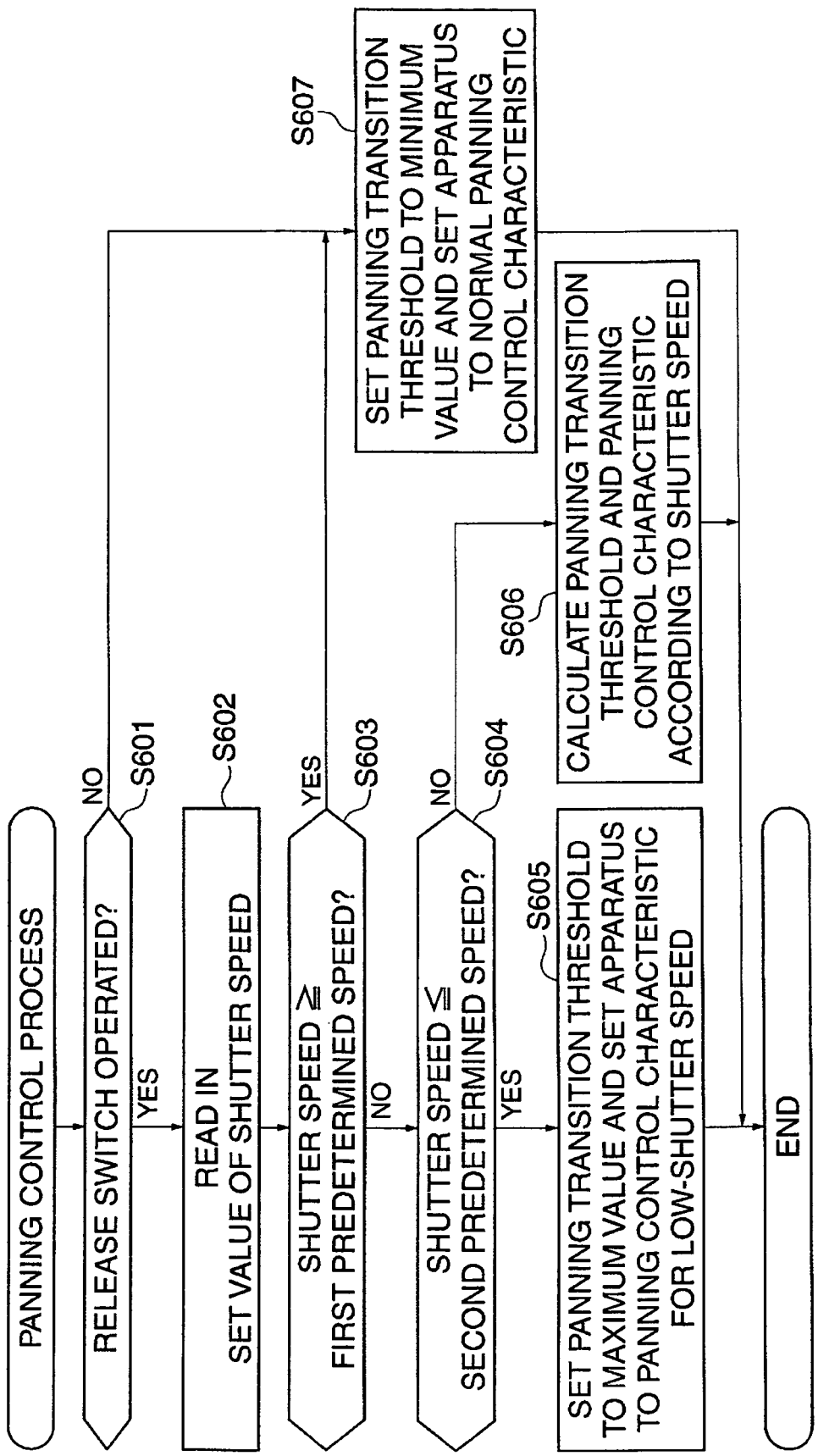
FIG. 7 is a flowchart showing a panning control process which is executed by the image pickup apparatus in FIG. 6.
Figure 8:
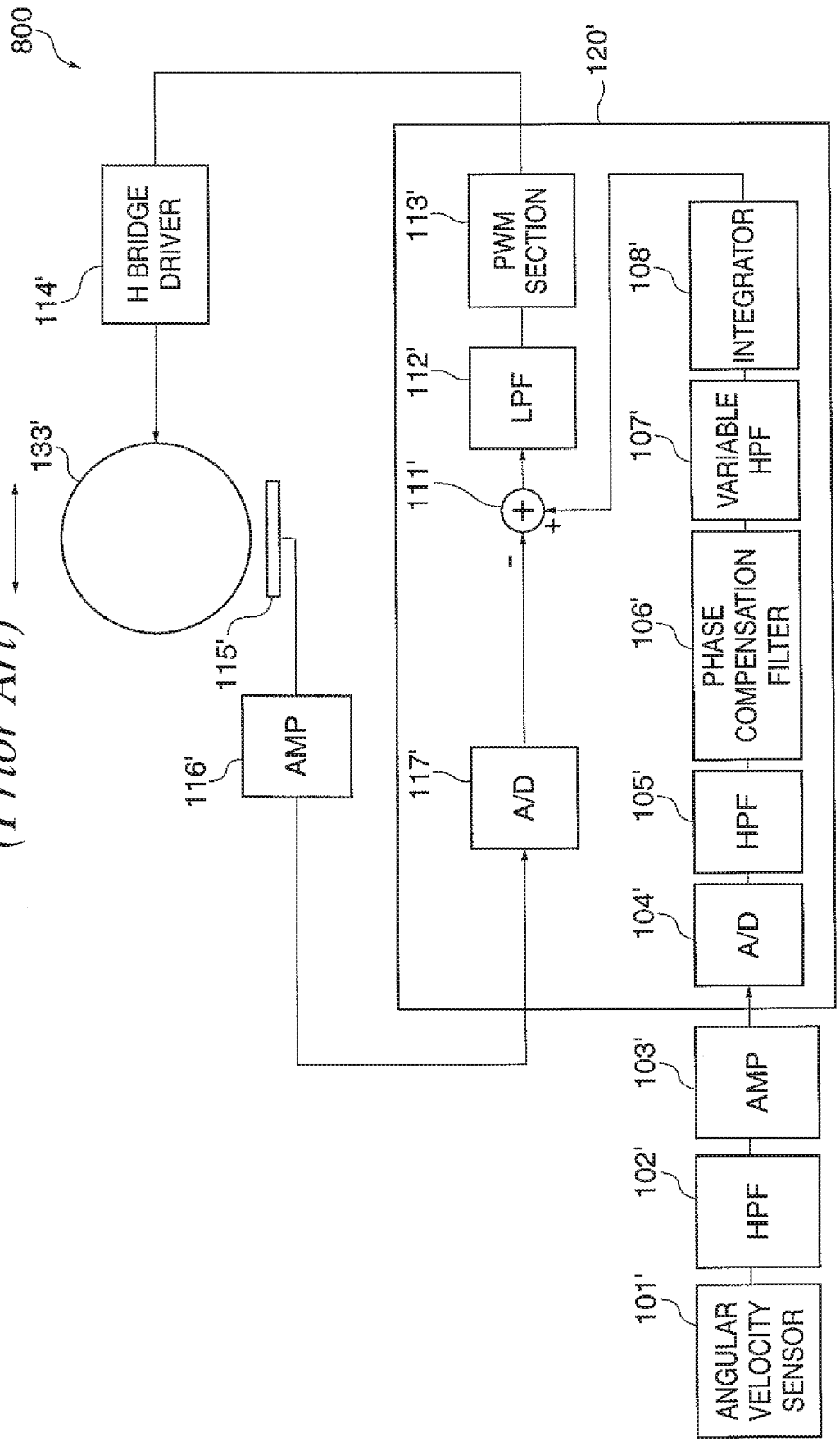
FIG. 8 is a block diagram schematically showing the arrangement of an image pickup apparatus incorporating a conventional shake correction device.

FIG. 7 is a flowchart showing the procedure of a panning control process which is executed by the image pickup apparatus in FIG. 6.

As shown in FIG. 7, first, it is determined whether or not the release switch has been operated (step S601). If the release switch has been operated, the set value of the shutter speed is read in (step S602), and then it is determined whether the shutter speed is not lower than the first predetermined speed (step S603).

If the shutter speed is not lower than the first predetermined speed, the panning transition threshold is set to its minimum value so as to set the image pickup apparatus 100 to the normal panning control characteristic (step S607), whereas if the shutter speed is lower than the first predetermined speed, it is determined whether the shutter speed is not higher than the second predetermined speed (step S604).

If the shutter speed is not higher than the second predetermined speed, the panning transition threshold is set to its maximum value so as to set the panning control characteristic to the characteristic for low-shutter speed (step S605), whereas if the shutter speed is higher than the second predetermined speed, the interpolated panning transition threshold is calculated from the maximum and minimum values of the panning transition threshold according to the shutter speed, and the panning control characteristic corresponding to the shutter speed is calculated (step S606).

On the other hand, if the release switch has not. been operated (NO to the step S601), the panning transition threshold is set to its minimum value so as to set the image pickup apparatus 100 to the normal panning control characteristic (step S607).

According to the process in FIG. 7, when the image pickup apparatus 100 is set to low-shutter speed, panning transition is performed as in the high-shutter speed (step S607) before the release switch is operated (NO to the step S601), and upon operation of the release switch, the image pickup apparatus 100 is set to the panning control characteristic for low-shutter speed (step S605). Therefore, at normal times, framing can be easily performed even in the low-shutter speed, and at actual shooting times, it is possible to enhance the shake prevention effect.

Although in the present embodiment, panning control is performed by changing the cut-off frequency of the variable HPF 107 according to the magnitude (correction angle) of the output from the integrator 108, it is also possible to execute the same panning control by changing the integration constant of the integrator 108.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the novel functions of the present invention, and hence the program code and a storage medium on which the program code is stored constitute the present invention.

Examples of the storage medium for supplying the program code include a flexible disk, a hard disk, a magneto-optical disk, an optical disk such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program code may be downloaded from a server computer via a communication network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

This application claims the benefit of Japanese Application No. 2005-016134, filed Jan. 24, 2005, which is hereby incorporated by reference herein in its entirety.

What is claimed is:

1. An image pickup apparatus that performs panning control with a predetermined panning control characteristic when the image pickup apparatus is in a panning condition, comprising:
    a shutter speed-setting device that sets a shutter speed at which the image pickup apparatus operates when shooting;
    a shake-detecting device that detects a shake of the image pickup apparatus;
    a correction amount-calculating device that calculates an amount of correction of the shake of the image pickup apparatus;
    a shake-correcting device that corrects the shake of the image pickup apparatus by driving a shift lens based on the calculated amount of correction of the shake of the image pickup apparatus;
    a panning-determining device that determines, based on the set shutter speed and the amount of correction of the shake of the image pickup apparatus, whether or not the image pickup apparatus is in the panning condition; and
    a panning control characteristic-changing device that changes the panning control characteristic based on the set shutter speed and the amount of correction of the shake of the image pickup apparatus,
    wherein as the set shutter speed becomes slower, said panning-determining device does not determine that the image pickup apparatus is in the panning condition, until the amount of correction of the shake of the image pickup apparatus becomes larger.

2. An image pickup apparatus as claimed in claim 1, further comprising a release device including a release switch for use in shooting, and
    wherein after said release switch is operated, said panning-determining device determines, based on the set shutter speed and the amount of correction of the shake of the image pickup apparatus, whether or not the image pickup apparatus is in the panning condition, until the operation of said release switch is canceled.

3. An image pickup apparatus as claimed in claim 1, wherein the panning control characteristic is set such that a cut-off frequency for use in the panning control becomes higher with an increase in the amount of correction of the shake of the image pickup apparatus.

4. An image pickup apparatus as claimed in claim 3, wherein a rate of increase in the cut-off frequency for use in the panning control with respect to the amount of correction of the shake of the image pickup apparatus becomes larger as the set shutter speed is slower.

5. An image pickup apparatus as claimed in claim 3, wherein a rate of increase in the cut-off frequency for use in the panning control with respect to the amount of correction of the shake of the image pickup apparatus is changed when the amount of correction becomes equal to a predetermined value.

6. An image pickup method for an image pickup apparatus that performs panning control with a predetermined panning control characteristic when the image pickup apparatus is in a panning condition, comprising:
- a shutter speed-setting step of setting a shutter speed at which the image pickup apparatus operates when shooting;
- a shake-detecting step of detecting a shake of the image pickup apparatus;
- a correction amount-calculating step of calculating an amount of correction of the shake of the image pickup apparatus;
- a shake-correcting step of correcting the shake of the image pickup apparatus by driving a shift lens based on the calculated amount of correction of the shake of the image pickup apparatus;
- a panning-determining step of determining, based on the set shutter speed and the amount of correction of the shake of the image pickup apparatus, whether or not the image pickup apparatus is in the panning condition; and
- a panning control characteristic-changing step of changing the panning control characteristic based on the set shutter speed and the amount of correction of the shake of the image pickup apparatus;
- wherein as the set shutter speed becomes slower, said panning-determining step does not determine that the image pickup apparatus is in the panning condition, until the amount of correction of the shake of the image pickup apparatus becomes larger.

7. An image pickup method as claimed in claim 6, wherein said panning-determining step comprises determining, after a release switch for use in shooting is operated, based on the set shutter speed and the amount of correction of the shake of the image pickup apparatus, whether or not the image pickup apparatus is in the panning condition, until the operation of said release switch is canceled.

8. An image pickup method as claimed in claim 6, wherein the panning control characteristic is set such that a cut-off frequency for use in the panning control becomes higher with an increase in the amount of correction of the shake of the image pickup apparatus.

9. An image pickup method as claimed in claim 8, wherein a rate of increase in the cut-off frequency for use in the panning control with respect to the amount of correction of the shake of the image pickup apparatus becomes larger as the set shutter speed is slower.

10. An image pickup method as claimed in claim 8, wherein a rate of increase in the cut-off frequency for use in the panning control with respect to the amount of correction of the shake of the image pickup apparatus is changed when the amount of correction becomes equal to a predetermined value.

11. An computer-readable medium storing a computer program for an image pickup apparatus that performs panning control with a predetermined panning control characteristic when the image pickup apparatus is in a panning condition, the computer program comprising:
- a shutter speed-setting module for setting a shutter speed at which the image pickup apparatus operates when shooting;
- a shake-detecting module for detecting a shake of the image pickup apparatus;
- a correction amount-calculating module for calculating an amount of correction of the shake of the image pickup apparatus;
- a shake-correcting module for correcting the shake of the image pickup apparatus by driving a shift lens based on the calculated amount of correction of the shake of the image pickup apparatus;
- a panning-determining module for determining, based on the set shutter speed and the amount of correction of the shake of the image pickup apparatus, whether or not the image pickup apparatus is in the panning condition; and
- a panning control characteristic-changing module for changing the panning control characteristic based on the set shutter speed and the amount of correction of the shake of the image pickup apparatus, p1 wherein as the set shutter speed becomes slower, said panning-determining module does not determine that the image pickup apparatus is in the panning condition, until the amount of correction of the shake of the image pickup apparatus becomes larger.

* * * * *